US007231504B2

(12) United States Patent
Kashyap et al.

(10) Patent No.: US 7,231,504 B2
(45) Date of Patent: Jun. 12, 2007

(54) DYNAMIC MEMORY MANAGEMENT OF UNALLOCATED MEMORY IN A LOGICAL PARTITIONED DATA PROCESSING SYSTEM

(75) Inventors: Sujatha Kashyap, Austin, TX (US); Mysore Sathyanarayana Srinivas, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 392 days.

(21) Appl. No.: 10/845,549

(22) Filed: May 13, 2004

(65) Prior Publication Data

US 2005/0257020 A1 Nov. 17, 2005

(51) Int. Cl.
*G06F 12/00* (2006.01)
(52) U.S. Cl. ...................................... 711/173
(58) Field of Classification Search .............. 711/173
See application file for complete search history.

(56) References Cited

U.S. PATENT DOCUMENTS

| 5,317,706 | A | 5/1994 | Pechter ..................... 395/400 |
|---|---|---|---|
| 5,539,895 | A | 7/1996 | Bishop et al. .............. 395/465 |
| 6,381,682 | B2* | 4/2002 | Noel et al. .................. 711/153 |
| 2002/0198995 | A1* | 12/2002 | Liu et al. ..................... 709/226 |
| 2003/0018782 | A1 | 1/2003 | Dixon et al. ................ 709/225 |
| 2003/0212873 | A1 | 11/2003 | Van Hoa et al. ............ 711/170 |
| 2004/0003063 | A1 | 1/2004 | Shamsundar et al. ....... 709/221 |
| 2004/0088498 | A1* | 5/2004 | Accapadi et al. ........... 711/147 |
| 2004/0205399 | A1* | 10/2004 | Wang et al. ................. 714/25 |
| 2005/0262393 | A1* | 11/2005 | King et al. .................... 714/13 |

FOREIGN PATENT DOCUMENTS

| EP | 0 836 140 | 4/1998 |
|---|---|---|
| EP | 1 089 173 | 4/2001 |
| WO | WO 03/071424 | 8/2003 |

OTHER PUBLICATIONS

Givil et al., Cellular Disco: resource management using virtual clusters on shared-memory multiprocessors, 1999, ACM 1-58113-140-2/99/0012.*

(Continued)

*Primary Examiner*—Woo H. Choi
(74) *Attorney, Agent, or Firm*—Marilyn S. Dawkins; Amy J. Pattillo

(57) ABSTRACT

A method, system, and program for dynamic memory management of unallocated memory in a logical partitioned data processing system. A logical partitioned data processing system typically includes multiple memory units, processors, I/O adapters, and other resources enabled for allocation to multiple logical partitions. A partition manager operating within the data processing system manages allocation of the resources to each logical partition. In particular, the partition manager manages allocation of a first portion of the multiple memory units to at least one logical partition. In addition, the partition manager manages a memory pool of unallocated memory from among the multiple memory units. Responsive to receiving a request for a memory loan from one of the allocated logical partitions, a second selection of memory units from the memory pool is loaned to the requesting logical partition. The partition manager, however, is enabled to reclaim the loaned selection of memory units from the requesting logical partition at any time.

31 Claims, 5 Drawing Sheets

OTHER PUBLICATIONS

"Dynamic Logical Partitioning in IBM eServer pSeries". IBM White Paper, copyright International Business Machines Corporation, Oct. 8, 2002, 13 pages.

Friedman, K, "Wie gut sind Capacity-on-demand-Angebote", Computerwoche, Computerwoche Verlag, Muenchen, DE, Feb. 13, 2003, 6 pages, ISSN: 0170-5121. No translation.

Jiang S Et Al, "TPF: A dynamic system thrashing protection facility", Software Practice and xperience, Wiley & Sons, Bognor Regis, GB, vol. 32, No. 3, Mar. 2002. pp. 295-318, ISSN: 0038-0644.

DB2 Administration Guide—How DB2 Uses Memory; Copyright International Business Machines Corporation, 1999; available from aurora.vcu.edu/db2help/db2d0/db2d0207.htm as of Feb. 17, 2004, p. 1-7.

DB2 Administration Guide—Extending Memory; Copyright International Business Machines Corporation, 1999; available from webdocs.caspur.it/ibm/web/udb-6.1/db2d0/db2d0196.htm as of Feb. 17, 2004, p. 1-2.

Kay A. Tate, Differences Between IBM eServer iSeries and pSeries Servers Running Linux, IBM eServer Solutions Enablement, Copyright International Business Machines Corporation 2003.

Logical Partition Security in the IBM eServer pSeries 690, Copyright International Business Machines Corporation Feb. 15, 2002.

Armstrong et al., White Papers for iSeries and AS/400: Logical Partitioning, Copyright International Business Machines Corporation, available at http://www-1.ibm.com/servers/eserver/iseries/whpapr/lpar.html as of at least Mar. 23, 2004.

* cited by examiner

DYNAMIC MEMORY MANAGEMENT OF UNALLOCATED MEMORY IN A LOGICAL PARTITIONED DATA PROCESSING SYSTEM

BACKGROUND OF THE INVENTION

1. Technical Field

The present invention relates in general to improved memory management and in particular to improved dynamic memory management of unallocated memory in a logical partitioned data processing system. Still more particularly, the present invention relates to enabling a logical partition to borrow memory from an available pool of unallocated memory managed by a partition manager within a data processing system to maximize use of the total memory in the data processing system.

2. Description of the Related Art

Many computer systems provide for partitioning. Partitioning, which is most typically implemented in server systems, divides the available system resources into logically partitioned groups. In particular, the memory devices, processors, and input/output (I/O) devices are logically partitioned into independent, secure groups of resources. An independent operating system image typically runs on each partition, allowing for multiple operating systems (OSs) to concurrently execute on a computer system, and allowing each partition to function independent of other partitions.

To maintain the independence and security of each logical partition, partition management firmware is typically implemented to manage the allocation of and access to resources for each logical partition. Specifically, with reference to partitioning memory resources, the partition management firmware will allocate a fixed amount of memory from the total available memory to each defined logical partition. The amount of memory allocated to a logical partition is typically decided at partition boot time. Additionally, however, a system administrator may be allowed to change the amount of memory allocated to a logical partition by sending dynamic reconfiguration commands to the partition management firmware to specify the addition or deletion of a specified amount of memory. If the system can meet the reconfiguration request, then the partition management firmware allocates or deallocates memory as requested. While system administrator directed reconfiguration of memory provides some control over memory allocation, it is limited because human intervention is required. In addition, system administrator directed reconfiguration of memory is limited because once memory is allocated, it is owned by the partition receiving the memory, and thus is not accessible by other partitions.

In any computing system, it is typical for the operating system to employ memory saving techniques when the number of free pages within allocated memory reaches a particular threshold. For example, when the number of free pages falls below a safe threshold, the operating system may initiate page stealing to reclaim allocated pages for the free page list.

In a logically partitioned system, however, employing a memory saving technique is not necessarily an efficient use of the total system resources. In particular, in a logically partitioned system, not all the memory resources available within the data processing system may be allocated when one partition reaches a memory use threshold. For example, in a system defined to have four logical partitions, if only two of the logical partitions are actually allocated, then the memory resources designated, but not allocated to the other two logical partitions, remain unused. In addition, it is more common for logically partitioned systems to have access to on-demand memory resources which, when initiated, increase the total memory resources of the system. Thus, a limitation of current logically partitioned systems is that when a partition reaches a memory use threshold, unless the system administrator allocates additional memory to the partition, the partition employs inefficient memory saving techniques, even though there is sufficient free memory in the data processing system.

Therefore, in view of the foregoing, it would be advantageous to provide a method, system, and program for partition management such that when a partition reaches a memory use threshold, then the partition management firmware controls memory loans of unallocated memory to requesting partitions, wherein the partition management firmware can reclaim the loaned memory if the memory is needed for allocation to another partition or the partition can return the memory when it is no longer needed. In addition, it would be advantageous for the memory pool of loanable memory to include on-demand memory, in addition to the fixed memory resources of the data processing system.

SUMMARY OF THE INVENTION

Therefore, the present invention provides a method, system, and program for dynamic memory management of unallocated memory in a logical partitioned data processing system. In particular, the present invention provides a method, system, and program for enabling a logical partition to borrow memory from an available pool of unallocated memory within a data processing system to maximize use of the total memory available in the data processing system, while at the same time allowing the partition manager to reclaim the loaned memory at any time.

According to one aspect of the invention, a logical partitioned data processing system typically includes multiple memory units, processors, I/O adapters, and other resources enabled for allocation to multiple logical partitions. A partition manager operating within the data processing system manages allocation of the resources to each logical partition. In particular, the partition manager manages allocation of a first portion of the multiple memory units to at least one logical partition. In addition, the partition manager manages a memory pool of unallocated memory from among the multiple memory units. Responsive to receiving a request for a memory loan from one of the allocated logical partitions, a second selection of memory units from the memory pool is loaned to the requesting logical partition. The partition manager is enabled to reclaim the loaned selection of memory units from the requesting logical partition at any time. In addition, the allocated logical partition may return the loaned selection when it is no longer needed.

The memory pool of unallocated memory may include all unallocated memory units available in the data processing system. Alternatively, a remote system manager may assign a selection of unallocated memory units to the memory pool. Further, the memory pool may include on-demand memory that is not currently allocated to a particular partition. Depending on the type of memory loaned from the memory pool, the length of the memory loan, and other factors, a cost for receiving the memory loan may be calculated by the partition manager.

The operating system executing within the requesting logical partition detects when a memory use threshold is reached within the first portion of memory units allocated to the requesting logical partition. The operating system determines whether requesting a memory loan or employing memory saving techniques is more advantageous. If a memory loan is more advantageous, then the operating system sends the request for the memory loan to the partition manager.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
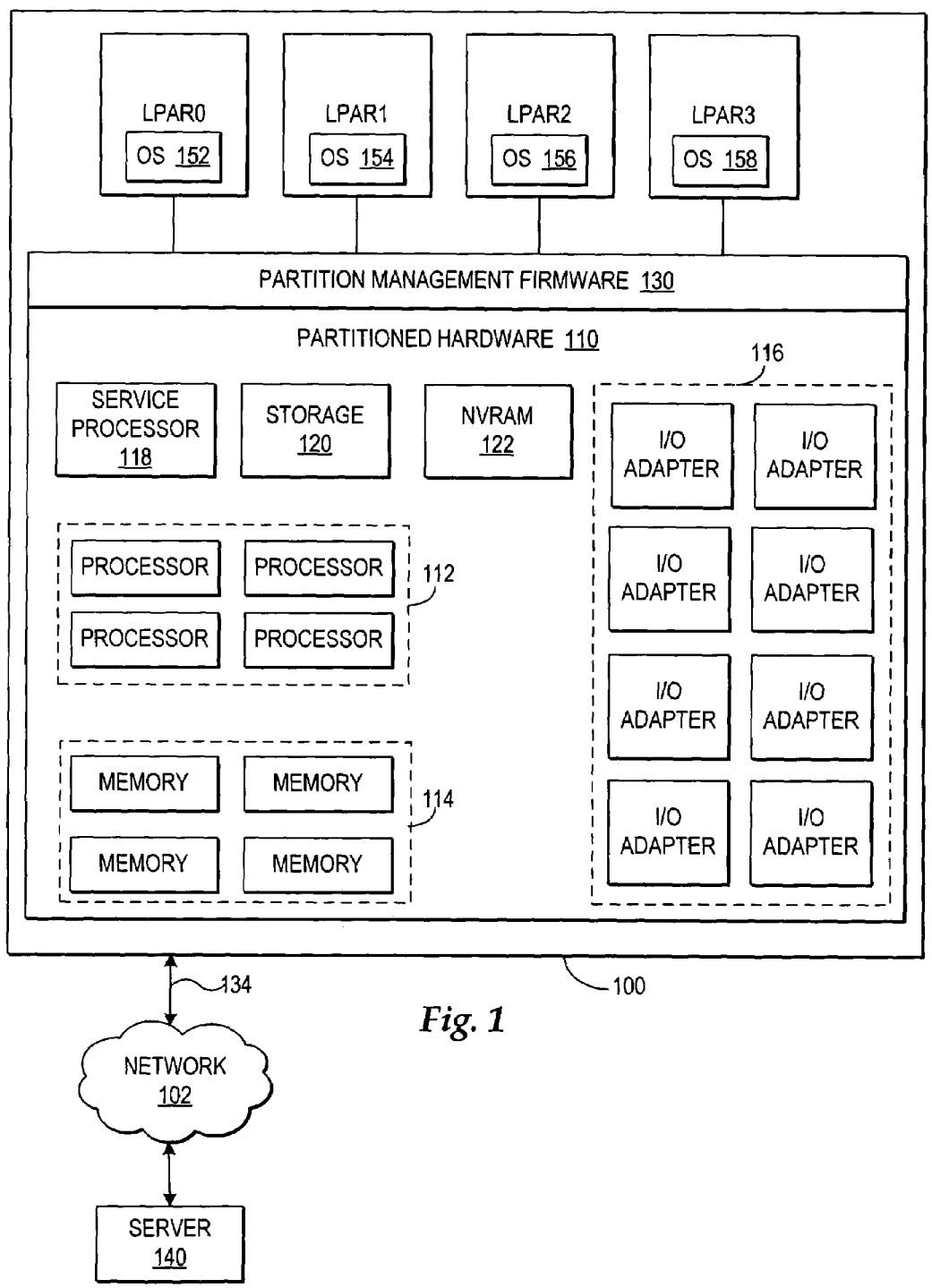
FIG. 1 is a block diagram depicting one embodiment of a logically partitioned data processing system in which the present method, system, and program may be implemented.

Referring now to the drawings, and in particular to FIG. 1, there is depicted a block diagram of one embodiment of a logically partitioned data processing system in which the present method, system, and program may be implemented. It will be understood that the present invention may be executed in a variety of systems, including a variety of computing systems and electronic devices.

In the example, data processing system 100 includes partitioned hardware 110. Partitioned hardware 110 includes the hardware components of data processing system 100 that can be allocated into logical partitions (LPARs) and managed by partition management firmware 130. For purposes of example, data processing system 100 is described with reference to the partitioned hardware, rather than a schematic showing how components of the hardware are interconnected. It will be understood, however, that the hardware components within partitioned hardware 110 of data processing system 100 are connected by multiple buses or other communication devices for communicating information within data processing system 100. The buses, for example, may include low-latency and higher latency paths connected by bridges and adapters and controlled by multiple controllers (not depicted). Further, it will be understood that in addition to the components illustrated in data processing system 100, additional components may be implemented within data processing system 100.

Within partitioned hardware 110, multiple hardware components include processors 112, memory units 114 and I/O adapters 116. Processors 112 may be general-purpose processors, such as IBM's PowerPC™ processors that, during normal operation, process data under the control of operating system and application software accessible from a dynamic storage device such as random access memory (RAM) and a static storage device such as Read Only Memory (ROM) built-in with each processor. In addition, memory units 114 may include multiple types of volatile and non-volatile memory which are partitioned and accessible to processors 112.

In one example, memory units 114 may include on-demand memory that is activated and allocated only when needed by data processing system 100. In addition, in one example, on-demand memory may be added to the total partitionable memory as accessible from other server systems via network 102, which is further described in detail hereafter.

In the example depicted, data processing system 100 is defined to include four logical partitions (LPARs), where each LPAR includes a portion of available processors 110, I/O adapters 112, and memory units 114. A separate operating system (OS) instance executes within each LPAR. For example, OS 152 operates in LPAR0, OS 154 operates in LPAR1, OS 156 operates in LPAR 2, and OS 158 operates in LPAR3. It will be understood that while data processing system 100 is defined to include four LPARs, resources are not automatically allocated for four LPARs. Further, it will be understood that any number of LPARs may be defined for a data processing system depending on the amount of resources available in the data processing system and the minimum required resource allocation for an LPAR. In particular, configurable determinations can be made for different partition implementations.

In one example of the implementation of a partition management layer NVRAM 122 may store a table identifying resource allocation among the LPARs. Partition management firmware 130, executing on service processor 118, accesses the table from NVRAM to provide for memory mapping and other partition security measures.

In addition, according to an advantage of the present invention, partition management firmware 130 may receive requests for borrowed memory from any of the allocated LPARs. Partition management firmware 130 then determines whether there any unallocated memory from the total memory available to the system can be loaned to a partition, on the condition that the memory will be returned if requested by partition management firmware 130. The table in NVRAM 122 is adjusted to reflect the loaned memory. It will be understood that the table and other data controlled by partition management firmware 130 may be stored in a data storage system other than NVRAM 122. Furthermore, it will be understood that partition management firmware 130 may be implemented using a hypervisor or other middleware enabled to allocate and control partitions within a data processing system.

Figure 4:
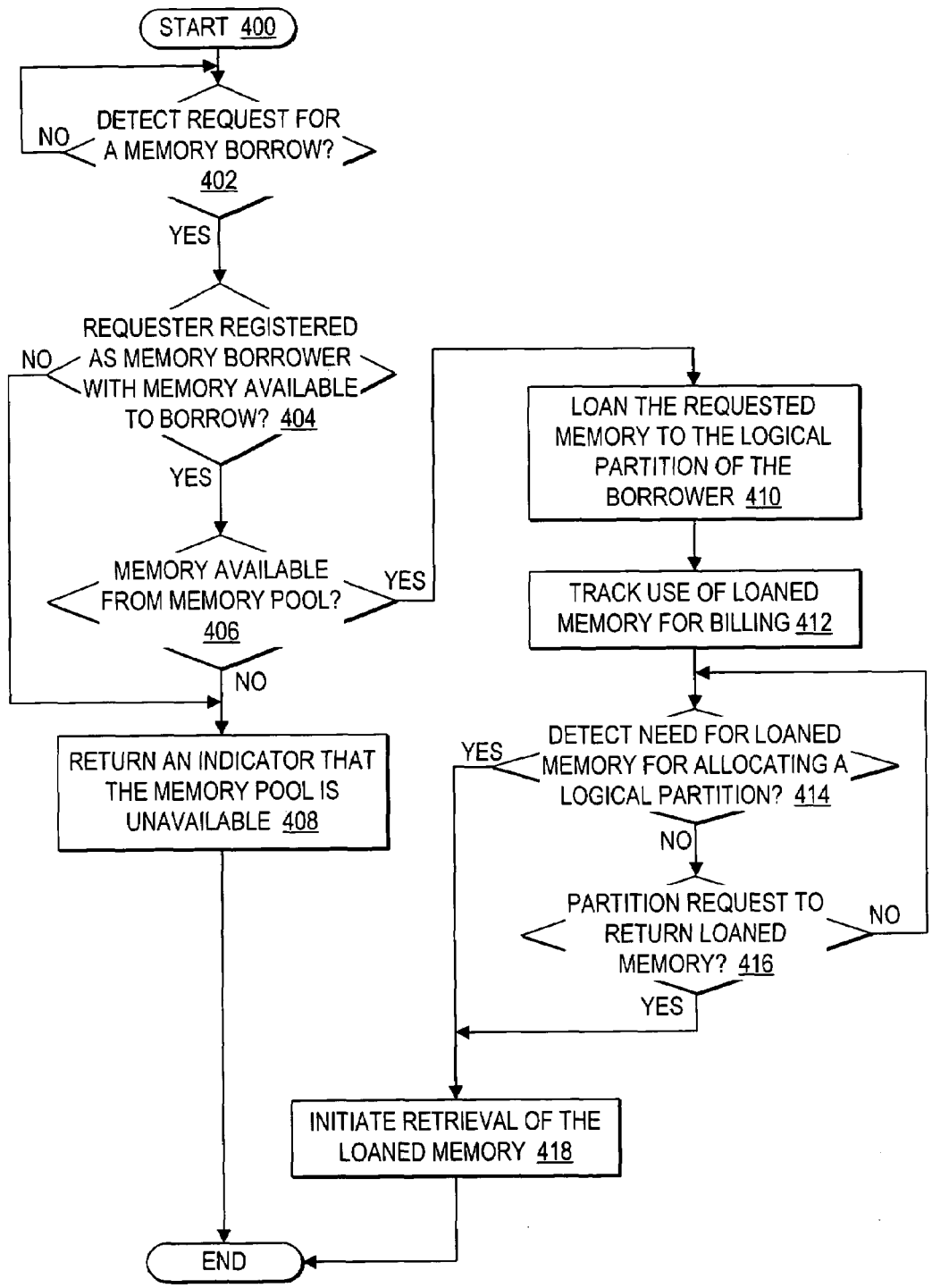
FIG. 4 is a high level logic flowchart of a process and program for controlling loans of unallocated memory in accordance with the method, system, and program of the present invention.
Figure 5:
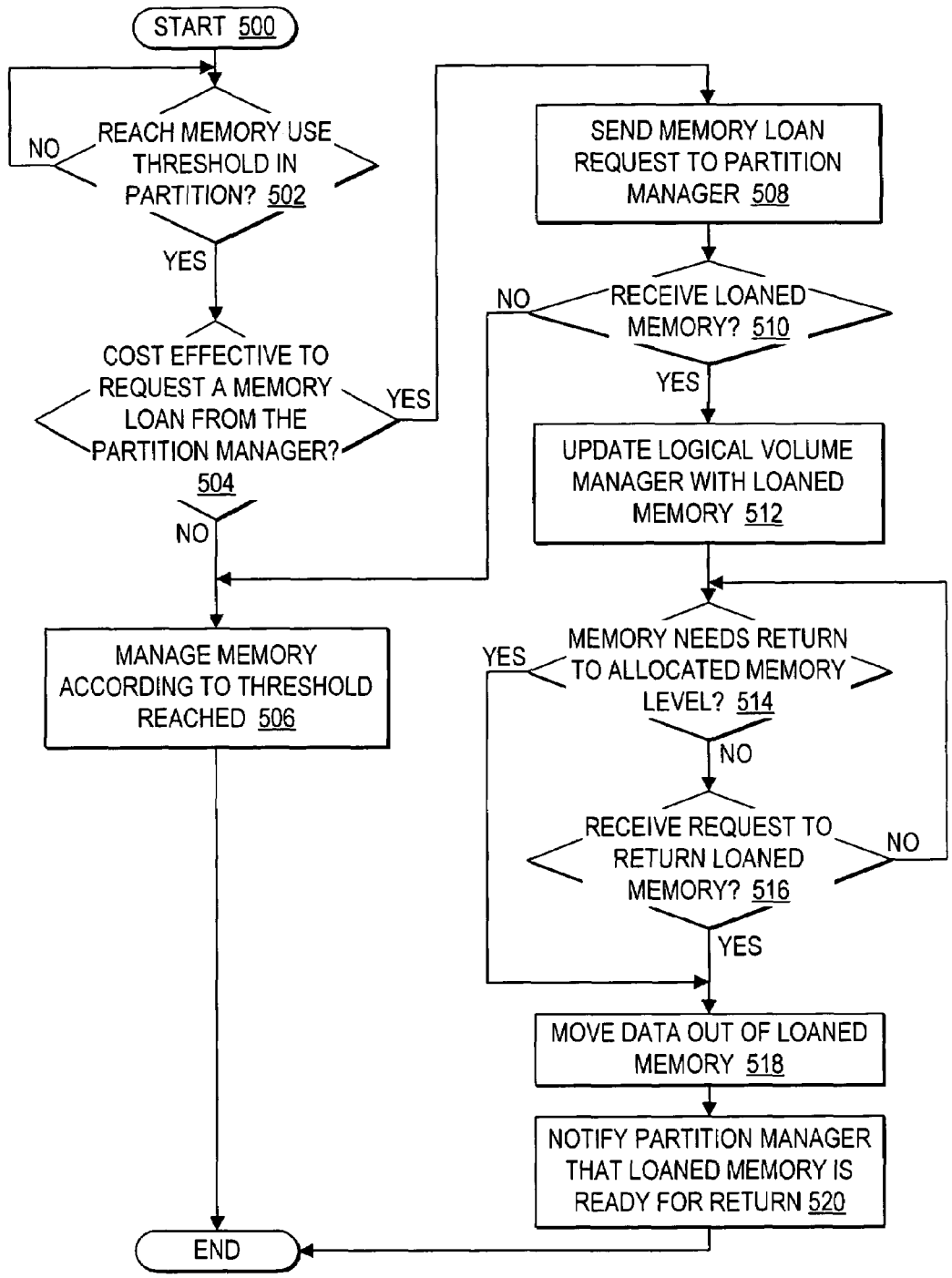
FIG. 5 is a high level logic flowchart of a process and program for an operating system executing within a partition to handle loaned memory.

In one embodiment, the operating systems or application software within each LPAR and partition management firmware 130 contain machine executable instructions that when executed on processors 112 or service processor 118 carry out the operations depicts in the flowchart of FIGS. 4 and 5, and other operations described herein. Alternatively, the steps of the present invention might be performed by specific hardware components that contain hardwired logic for performing the steps, or by any combination of programmed computer components and custom hardware components.

The present invention may be provided as a computer program product, included on a machine-readable medium having stored thereon the machine executable instructions used to program data processing system 100 to perform a process according to the present invention. The term "machine-readable medium" as used herein includes any medium that participates in providing instructions to processors 112 or service processor 118 or other components of data processing system 100 for execution. Such a medium may take many forms including, but not limited to, non-volatile media, volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which data processing system 100 can read and which is suitable for storing instructions. In the present embodiment, examples of non-volatile mediums are mass storage device 120 and non-volatile RAM (NVRAM) 122 which as depicted are internal components of data processing system 100, but will be understood to also be provided by an external device. Volatile media include dynamic memory such as RAM. Transmission media include coaxial cables, copper wire or fiber optics, including the wires that comprise buses (not depicted). Transmission media can also take the form of acoustic or light waves, such as those generated during radio frequency or infrared data communications.

Moreover, the present invention may be downloaded as a computer program product, wherein the program instructions may be transferred from a remote computer such as a server 140 to requesting data processing system 100 by way of data signals embodied in a carrier wave or other propagation medium via a network link 134 (e.g. a modem or network connection) to a communications interface of data processing system 100. The communications interface provides a two-way data communications coupling to network link 134 that may be connected, for example, to a local area network (LAN), wide area network (WAN), or directly to an Internet Service Provider (ISP). In particular, network link 134 may provide wired and/or wireless network communications to one or more networks.

Network link 134 in turn provides data communication services through network 102. Network 102 may refer to the worldwide collection of networks and gateways that use a particular protocol, such as Transmission Control Protocol (TCP) and Internet Protocol (IP), to communicate with one another. Alternatively, network 102 may refer to a local network, a private network, or other networks created for the distribution of information and computing resources, such as a grid computing network. Network link 134 and network 102 both use electrical, electromagnetic, or optical signals that carry digital data streams. The signals through the various networks and the signals on network link 134 and through the communication interface, which carry the digital data to and from data processing system 100, are exemplary forms of carrier waves transporting the information.

It is important to note that in addition to server 140 providing a computer program product, server 140 may enable a remote management interface for a system administrator or remote manager to direct dynamic reconfiguration commands to partition management firmware 130 via network 102. In particular, when a system administrator or remote manager chooses to explicitly direct dynamic reconfiguration, partition management firmware 130 receives commands to allocate or deallocate resources to partitions and adjusts the allocation of resources according to the commands.

Figure 2:
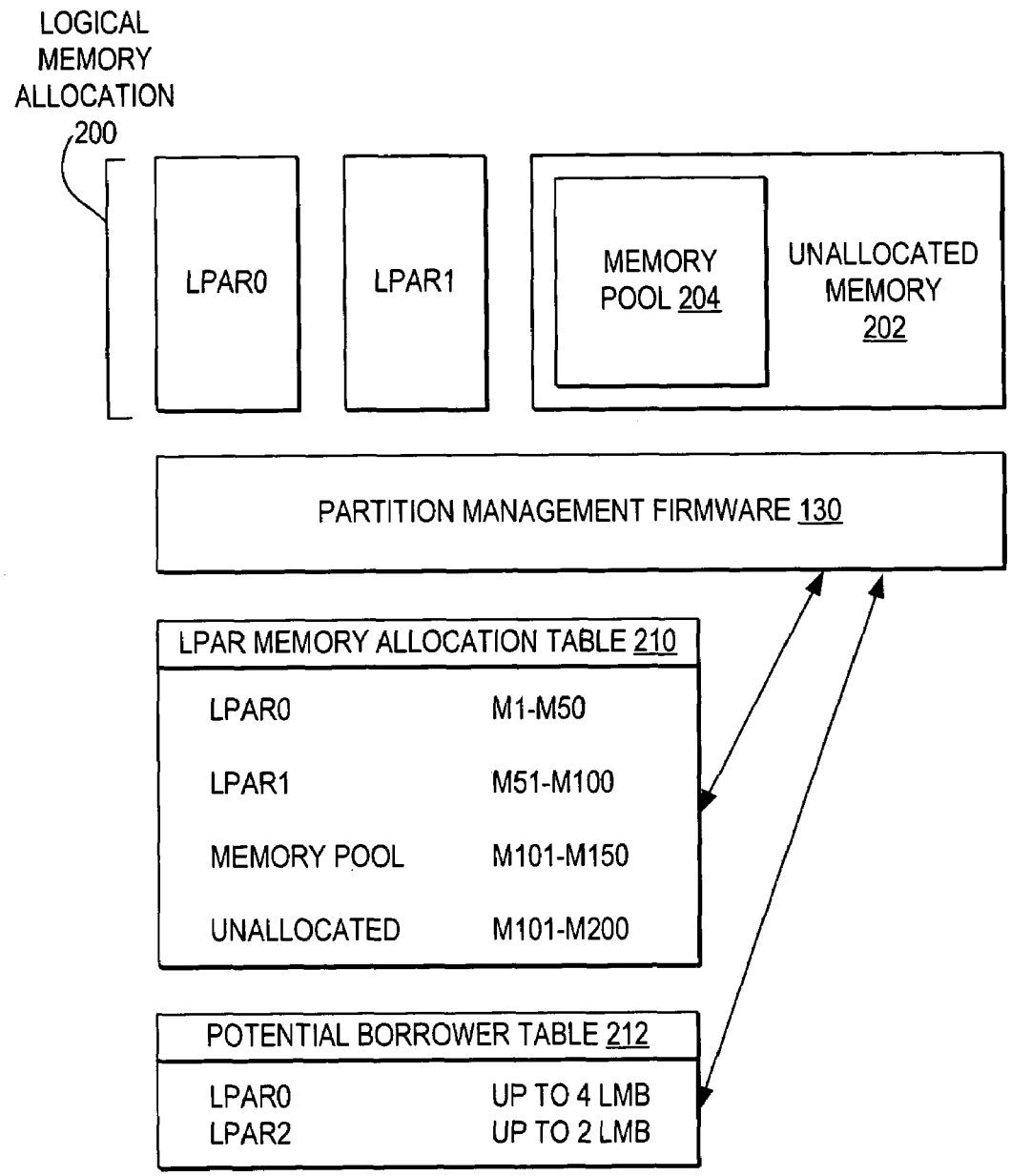
FIG. 2 is a pictorial illustration of the management of the total memory available in a data processing system by a partition manager.

Referring now to FIG. 2, there is depicted a pictorial illustration of the management of the total memory available in a data processing system. As depicted at reference numeral 200, in the pictorial example, the logical memory allocation for a data processing system includes memory allocated to LPAR0 and LPAR1. The remainder of the memory available in the data processing system is logically unallocated memory 202. It is important to note that while a number of partitions may be defined for a data processing system, such as the four partitions defined for data processing system 100, not all partitions are required to be concurrently activated and allocated resources.

An LPAR memory allocation table 210 records the physical allocation of memory to LPAR0 and LPAR1 for use by partition management firmware 130 in data mapping and monitoring usage of the total memory available in the data processing system. In addition, LPAR memory allocation table 210 includes the mapping for the unallocated memory within data processing system 100.

According to an advantage of the present invention, unallocated memory may be designated as available in memory pool 204. In particular, a system administrator may explicitly designate particular portions of memory or particular types of memory to be included in memory pool 204 or may allow all unallocated memory to be included in memory pool 204. On platforms where affinity is a consideration, the system administrator may select to assign a portion of memory from each affinity domain to memory pool 204. It will be understood that configurable determinations can be made for different partition implementations.

Logically, memory pool 204 indicates the portion of unallocated memory available for the memory pool. In addition, LPAR memory allocation table 210 records the portion of memory designated as available for the memory pool. It is important to note that memory pool 204 may include both fixed memory and on-demand memory. Further, it is important to note that memory pool 204 may include a portion of unallocated memory 202 or all unallocated memory in data processing system 100 may be available in memory pool 204.

Partition management firmware 130 may loan memory available in memory pool 204 to other partitions as requested by a partition. The OS within each partition decides when to request memory loans and may specify the type of memory requested.

In particular, the OS of each partition monitors when the free space available in the memory allocated to the partition reaches a particular memory use threshold. Once that threshold is reached, the OS may begin to employ memory saving techniques, such as page stealing. In the present invention, however, once a memory use threshold is reached, the OS may alternatively request a memory loan from partition management firmware 130. For example, where an OS requests a loan of memory, a function such as H_MEMORY_LOAN, may be sent by the OS to partition management firmware 130, such as a hypervisor, with a parameter indicating the amount of memory requested.

In determining whether an OS should employ memory saving techniques or request to borrow memory, it is important to note that partition management firmware 130 may track memory at one granularity, while each OS tracks memory at a different granularity, but partition management firmware 130 only loans in blocks of memory of the first granularity. For example, partition management firmware 130 may track each 16 MB of contiguous real memory, called logical memory blocks (LMBs), while the OS tracks each 4K of contiguous real memory allocated to the partition. The OS may only need to borrow 4 MB of memory, but partition management firmware 130 only loans in 16 MB blocks of memory. Thus, if the cost of borrowing 16 MB of memory when only 4 MB are needed is cost prohibitive, the OS may determine to employ memory saving techniques, rather than request to borrow memory. Alternatively, however, it is important to note that partition management firmware 130 may manage blocks of memory in smaller LMB to accommodate the varying degrees of granularity at which the operating systems running on the data processing system track memory.

In addition, in determining whether an OS should employ memory saving techniques or request to borrow memory, it is important to note that memory saving techniques significantly reduce the efficiency of the partition. Thus, where efficiency is paramount to cost, the operating system may request a memory loan to improve efficiency.

In another example, LPARs allowed to borrow memory may be required to register with partition management firmware 130. Potential borrower table 212 reflects the LPARs registered as potential borrowers from the memory pool. In addition, a maximum loan amount may be specified for each potential borrower. In the example, maximum loan amounts are specified in LMBs, however, it will be understood that minimum and maximum loan amounts may be specified in other units, including cost. In addition, minimum and maximum loan amounts may be specified according to whether fixed or on-demand memory is borrowed. In one embodiment, a system administrator accessing data processing system 100 via a remote terminal can adjust the LPARs registered in potential borrower table 212.

It is important to note that the amount of on-demand memory required for a system to handle peak loads may decrease when memory loans are also available. For example, if the average memory demand for a partition is 4 GB, but the peak memory demand is 8 GB, then without the memory pool, a customer may pay for 8 GB of on-demand memory to be allocated to a particular partition, when only 4 GB is needed 90% of the time. With the memory pool, the customer may only pay for 4 GB of on-demand memory to be allocated to the particular partition, and allow the operating system of the particular partition to access the spare memory pool to borrow the remaining 4 GB. Further, where multiple partitions require an additional 4 GB during peak usage, 4 GB of on-demand memory may be allocated to the memory pool and loaned to each partition when needed. Assuming that the memory demand on each of the partitions does not peak at the same time, the availability of on-demand loanable memory may greatly reduce the amount of on-demand memory required to be allocated to each partition. It is important to note that on-demand memory is memory that is typically available for allocation over a particular period of time at a particular cost. In addition, however, on-demand memory may include any other memory available to data processing system 100 in exchange for a commodity.

Figure 3:
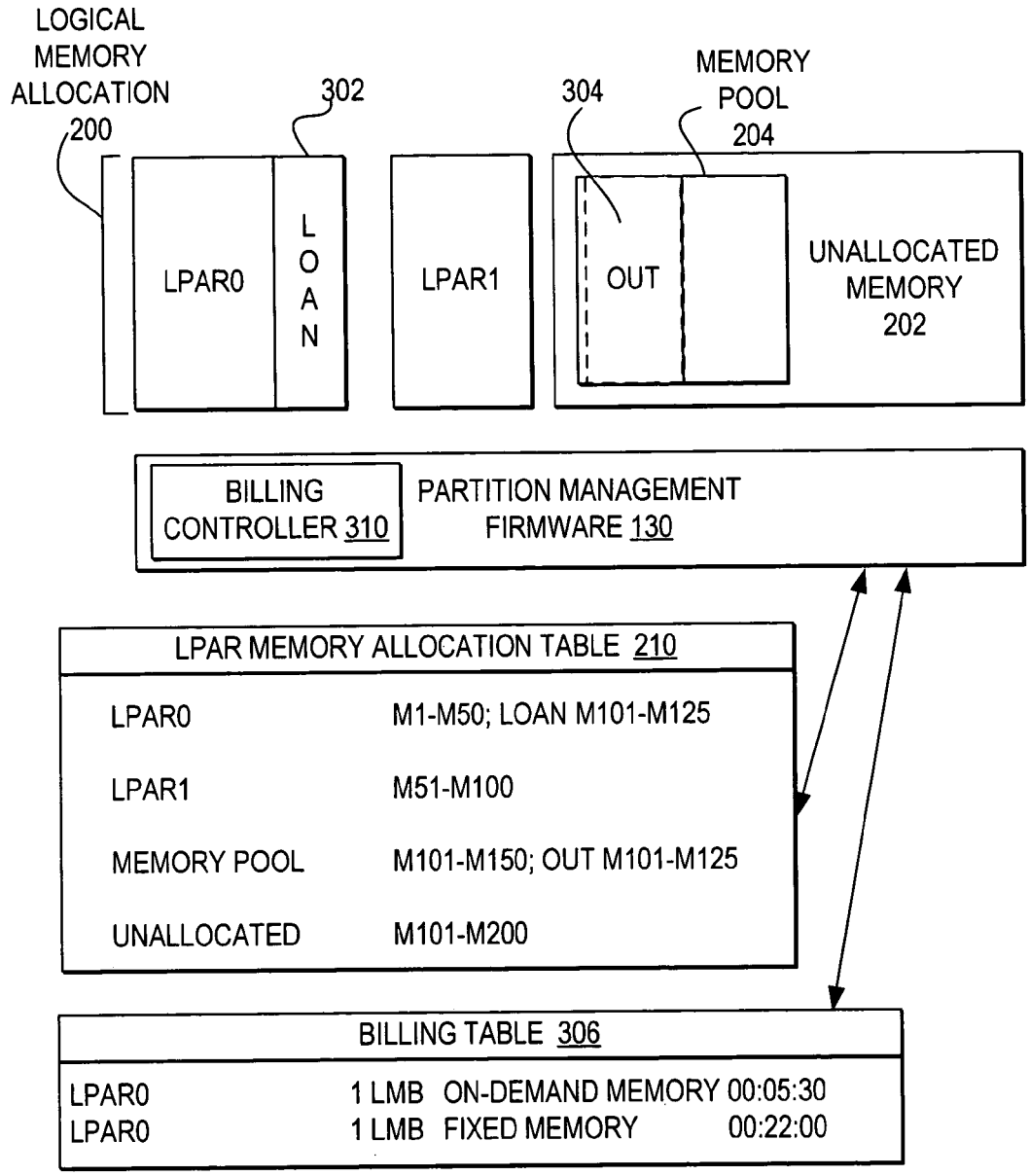
FIG. 3 is a pictorial illustration of a partition manager controlling memory loans from a memory pool available in a data processing system.

With reference now to FIG. 3, there is depicted a pictorial illustration of a partition manager controlling memory loans from a memory pool available in a data processing system. As depicted, a portion of memory identified at reference numeral 304 is loaned from memory pool 204 to LPAR0. In particular, the loaned memory is logically accessible to LPAR0 as indicated at reference numeral 302. The OS of LPAR0 preferably incorporates the loaned memory, however, may designate the loaned memory for certain types of data. In addition, LPAR memory allocation table 210 is updated is indicate the specific portion of memory loaned to LPAR0.

If partition management firmware 130 receives a request from a system administrator or other controller to allocate or deallocate resources to another partition, then partition management firmware 130 may need to recall the loaned memory from LPAR0 by sending an instruction to return the borrowed memory. In particular, the system administrator or other remote controller will likely view the available unallocated memory independent of any memory loans. Advantageously, however, partition management firmware 130 enables the use of at least a portion of the unallocated memory in the data processing system by partitions that are short on free pages until a request is received to allocate that memory to a partition. Thus, by allowing partition management firmware 130 to loan unallocated memory to LPAR0, the invocation of a page stealer or other memory saving techniques in LPAR0 are postponed until there is an actual shortage of memory in the entire memory system available to data processing system 100, rather than when the operating system executing within LPAR0 perceives a shortfall of memory.

In another example, a billing controller 310 within partition management firmware 130 detects and tracks the use of borrowed memory. In one embodiment, a billing table 306 preferably stores which LPAR uses borrowed memory, the amount of borrowed memory, the type of memory borrowed, and the time period borrowed. In addition, billing table 306 may indicate the cost calculated for borrowing memory and other information helpful for a billable transaction. Although not depicted, partition management firmware 130 may also maintain a table of current costs for memory and minimum and maximum time lengths for borrowing memory, such that billing controller 310 controls billing and memory loans based on the costs and time limits for borrowing memory.

As a partition no longer needs loaned memory, the memory is returned to memory pool 204. When loaned memory is charged for, there is a financial incentive for a partition to return memory to memory pool 204 when the loaned memory is no longer needed. Additional incentives may be provided, for example, if the operating system works to free LMBs that are no longer needed, such that loaned memory is returned in parts over time.

With reference now to FIG. 4, there is depicted a high level logic flowchart of a process and program for controlling loans of unallocated memory in accordance with the method, system, and program of the present invention. As depicted, the process starts at block 400 and thereafter proceeds to block 402.

Block 402 depicts a determination whether a request to borrow memory is received. The request to borrow memory may be received, for example, from a partition or from a system administrator command. If a request to borrow memory is not received, then the process iterates at block 402. If a request to borrow memory is received, then the process passes to block 404. Block 404 depicts a determination whether the requester is registered as a memory borrower with memory available to borrow. In particular, when a memory borrower registers with the partition controller, a maximum amount of memory per borrow or total memory to be borrowed at one time may be specified. If the requester is not registered to borrow memory or the request exceed the memory available to that borrower, then the process passes to block 408. Block 408 depicts returning an indicator the memory pool is unavailable for loans, and the process ends. Alternatively, at block 404, if the requester is registered to borrow memory and the request is within the memory available to the requester, then the process passes to block 406.

Block 406 depicts a determination whether there is sufficient memory available from the memory pool to complete the request. If there is insufficient memory available, then the process passes to block 408 and the requester is notified that the memory pool is unavailable. Although not depicted, if some memory is available, just not sufficient memory to complete the request, the partition controller may alternatively decide to fill a portion of the request. In addition, at block 406, if there is sufficient memory available in the memory pool, then the process passes to block 410.

Block 410 depicts loaning the requested memory to the logical partition of the borrower. The LPAR memory allocation table is updated to indicate the memory loan. Next, block 412 depicts tracking use of loaned memory for billing the borrower. Thereafter, block 414 depicts a determination whether a need for the loaned memory for allocating a logical partition or other request by the system administrator related to the loaned memory is detected. If no need is detected, then the process passes to block 416. Block 416 depicts a determination whether a request is received from the partition to return the loaned memory. If no request is received from the partition, then the process passes to block 414. At block 414 if a need for the loaned memory is detected or at block 416 if a loan return request is received from the partition, then the process passes to block 418. Block 418 depicts initiating a retrieval of the loaned memory from the borrower partition, and the process ends.

Referring now to FIG. 5, there is depicted a high level logic flowchart of a process and program for an operating system executing within a partition to handle loaned memory. As depicted, the process starts at block 500 and thereafter proceeds to block 502. Block 502 depicts a determination whether memory use within the partition has reached a threshold after which memory saving techniques, such as page stealing, may be initiated. If memory use has not reached a threshold, then the process iterates at block 502. If memory has reached a threshold, then the process passes to block 504.

Block 504 depicts a determination whether it would be cost effective to request a memory loan from the partition manager. In particular, a cost per LMB of memory may be predetermined or the OS may request current prices for use of LMB to determine cost effectiveness. Further, in considering cost effectiveness, factors such as the size of the LMB versus the amount of memory needed and the minimum time period for the loaned memory may be considered. If it is not cost effective to request a memory loan, then the process passes to block 506. Block 506 depicts managing the memory according to the memory saving techniques for the memory use threshold reached, and the process ends. Alternatively, at block 504, if it is cost effective to request a memory loan, then the process passes to block 508.

Block 508 depicts sending a memory loan request to the partition manager. Next, block 510 depicts a determination whether the requested memory loan is received. If the requested memory loan is not received, then the process passes to block 506. If the requested memory loan is received, then the process passes to block 512. Block 512 depicts updating the logical volume manager with the loaned memory. Next, block 514 depicts a determination whether the memory needs of the partition return to the allocated memory available, such that the loaned memory is no longer necessary. If the loaned memory is still necessary, then the process passes to block 516. Block 516 depicts a determination whether a request to return the loaned memory is received from the partition manager. If a request to return the loaned memory is not received, then the process passes to block 514. At block 514 if the loaned memory is no longer necessary or at block 516 if a request to return the loaned memory is received, then the process passes to block 518. Block 518 depicts moving data out of the loaned memory. Next, block 520 depicts notifying the partition manager that the memory is available for return, and the process ends.

While the invention has been particularly shown and described with reference to a preferred embodiment, it will be understood by those skilled in the art that various changes in form and detail may be made therein without departing from the spirit and scope of the invention.

What is claimed is:

1. A system for managing loans of memory within a data processing system, comprising:

a data processing system comprising a plurality of memory units enabled for a data processing system comprising a plurality of memory units enabled for allocation to a plurality of defined logical partitions;

a partition manager for allocating a first selection of said plurality of memory units to at least one logical partition of allocated resources and for managing a memory pool of unallocated memory from among said plurality of memory units;

said partition manager, responsive to receiving a request for a memory loan from said at least one logical partition, for loaning a second selection of said plurality of memory units from said memory pool to said at least one logical partition on the basis that said partition manager controls retrieval of said second selection of said plurality of memory units from said at least one logical partition at any time; and said partition manager, responsive to receiving a request to allocate a portion of said unallocated memory comprising said second selection of said plurality of memory units to a particular one of said plurality of defined logical partitions, for controlling retrieval of said second selection of said plurality of memory units from said at least one logical partition for allocation to said particular one of said plurality of defined logical partitions.

2. The system according to claim 1 for managing loans of memory within a data processing system wherein said plurality of memory units assigned to said memory pool from among said unallocated memory are assigned by a remote system manager.

3. The system according to claim 1 for managing loans of memory within a data processing system wherein said plurality of memory units further comprise a plurality of fixed memory units and a plurality of on-demand memory units, wherein access to said plurality of on-demand memory units is limited to a particular time period at a particular cost for access.

4. The system according to claim 1 for managing loans of memory within a data processing system wherein a particular instance of an operating system executes within said at least one logical partition, wherein said operating system sends said request for said memory loan to said partition manager.

5. The system according to claim 4 for managing loans of memory within a data processing system wherein said particular instance of said operating system performs, responsive to reaching a memory use threshold, one of sending said request for said memory loan and page stealing based on a comparison of the financial cost of borrowing memory to an efficiency lost by page stealing.

6. The system according to claim 1, for managing loans of memory within a data processing system wherein responsive to detecting thrashing in said at least one partition, said at least one partition sends said request for said memory loan to said partition manager.

7. The system according to claim 1, for managing loans of memory within a data processing system wherein responsive to detecting page stealing in said at least one partition, said at least one partition sends said request for said memory loan to said partition manager.

8. The system according to claim 1 for managing loans of memory within a data processing system wherein said at least one logical partition sends said request for said memory loan responsive to use of said first selection of said plurality of memory units reaching a memory use threshold.

9. The system according to claim 1 for managing loans of memory within a data processing system, wherein said at least one logical partition returns said second selection of said plurality of memory units to said partition manager for placement in said memory pool responsive to use of said first selection of said plurality of memory units and said second selection of said plurality of memory units falling below a memory use threshold.

10. The system according to claim 1 for managing loans of memory within a data processing system, wherein said first selection of said plurality of memory units allocated to said at least one logical partition can only be reclaimed by said partition manager if a remote system manager sends a deallocation request to said partition manager.

11. The system according to claim 1 for managing loans of memory within a data processing system wherein said partition manager further comprises means for tracking a billable cost for said loan of said second selection of said plurality of memory units to said at least one logical partition based a unit cost associated with on at least one from among an amount of memory borrowed, a type of memory borrowed, and a time period for which memory is borrowed.

12. A method for managing loans of memory within a data processing system, comprising:
    enabling a plurality of memory units for allocation by a partition manager to a plurality of defined logical partitions within a data processing system;
    allocating, by said partition manager, a first selection of said plurality of memory units to at least one logical partition of allocated resources;
    monitoring, by said partition manager, a memory pool of unallocated memory from among said plurality of memory units;
    responsive to said partition manager receiving a request for a memory loan from said at least one logical partition, loaning by said partition manager a second selection of said plurality of memory units from said memory pool to said at least one logical partition on the basis that said partition manager controls retrieval of said second selection of said plurality of memory units from said at least one logical partition at any time; and
    responsive to said partition manager receiving a request to allocate a portion of said unallocated memory comprising said second selection of said plurality of memory units to a particular one of said plurality of defined logical partitions, for controlling retrieval by said partition manager of said second selection of said plurality of memory units from said at least one logical partition for allocation to said particular one of said plurality of defined logical partitions.

13. The method according to claim 12 for managing loans of memory within a data processing system further comprising:
    responsive to receiving an unallocated memory assignment request from a remote system manager, assigning a selection of memory units to said memory pool from among said unallocated memory according to said unallocated memory assignment request.

14. The method according to claim 12 for managing loans of memory within a data processing system wherein said plurality of memory units further comprise a plurality of fixed memory units and a plurality of on-demand memory units, wherein access to said plurality of on-demand memory units is limited to a particular time period at a particular cost for access.

15. The method according to claim 12 for managing loans of memory within a data processing system further comprising:
    executing a particular instance of an operating system within said at least one logical partition, wherein said operating system sends said request for said memory loan to said partition manager.

16. The method according to claim 15 for managing loans of memory within a data processing system wherein said particular instance of said operating system performs, responsive to reaching a memory use threshold, one of sending said request for said memory loan and page stealing based on a comparison of the financial cost of borrowing memory to an efficiency lost by page stealing.

17. The method according to claim 12, for managing loans of memory with in a data processing system further comprising:
    responsive to detecting thrashing in said at least one partition, sending said request for said memory loan to said partition manager.

18. The method according to claim 12, for managing loans of memory within a data processing system further comprising:
    responsive to detecting page stealing in said at least one partition, sending said request for said memory loan to said partition manager.

19. The method according to claim 12 for managing loans of memory within a data processing system, further comprising:
    responsive to use of said first selection of said plurality of memory units reaching a memory use threshold, sending said request for said memory loan to a partition manager.

20. The method according to claim 12 for managing loans of memory within a data processing system, further comprising:
    responsive to use of said first selection of said plurality of memory units and said second selection of said plurality of memory units falling below a memory use threshold, returning said second selection of said plurality of memory units to said partition manager for placement in said memory pool.

21. The method according to claim 12 for managing loans of memory with in a data processing system, further comprising:
    only enabling a partition manager to reclaim said first selection of said plurality of memory units allocated to said at least one logical partition if a remote system manager sends a deallocation request to said partition manager.

22. The method according to claim 12 for managing loans of memory within a data processing system, further comprising:
    tracking a billable cost for said loan of said second selection of memory units to said at least one logical partition based a unit cost associated with on at least one from among an amount of memory borrowed, a type of memory borrowed, and a time period for which memory is borrowed.

23. An executable computer program product, residing on a machine-readable storage medium, for managing loans of memory within a data processing system, comprising:
   means for enabling a plurality of memory units for allocation by a partition manager to a plurality of defined logical partitions within a data processing system;
   means for allocating a first selection of said plurality of memory units to at least one logical partition of allocated resources;
   means for monitoring a memory pool of unallocated memory from among said plurality of memory units;
   means responsive to said partition manager receiving a request for a memory loan from said at least one logical partition, for loaning a second selection of memory units from said memory pool to said at least one logical partition on the basis that said partition manager controls retrieval of said second selection of said plurality of memory units from said at least one logical partition at any time; and
   means, responsive to said partition manager receiving a request to allocate a portion of said unallocated memory comprising said second selection of said plurality of memory units to a particular one of said plurality of defined logical partitions, for controlling retrieval by said partition manager of said second selection of said plurality of memory units from said at least one logical partition for allocation to said particular one of said plurality of defined logical partitions.

24. The computer program product according to claim 23 for managing loans of memory within a data processing system further comprising:
   means responsive to receiving an unallocated memory assignment request from a remote system manager, for assigning a selection of memory units to said memory pool from among said unallocated memory according to said unallocated memory assignment request.

25. The computer program product according to claim 23 for managing loans of memory within a data processing system further comprising:
   means for executing a particular instance of an operating system within said at least one logical partition, wherein said operating system sends said request for said memory loan to said partition manager.

26. The computer program product according to claim 23, for managing loans of memory within a data processing system further comprising:
   means, responsive to detecting thrashing in said at least one partition, for sending said request for said memory loan to said partition manager.

27. The computer program product according to claim 23, for managing loans of memory within a data processing system further comprising:
   means, responsive to detecting page stealing in said at least one partition, for sending said request for said memory loan to said partition manager.

28. The computer program product according to claim 23 for managing loans of memory within a data processing system, further comprising:
   means, responsive to use of said first selection of said plurality of memory units reaching a memory use threshold, for sending said request for said memory loan to a partition manager.

29. The computer program product according to claim 23 for managing loans of memory within a data processing system, further comprising:
   means, responsive to use of said first selection of said plurality of memory units and said second selection of said plurality of memory units falling below a memory use threshold, for returning said second selection of said plurality of memory units to said partition manager for placement in said memory pool.

30. The computer program product according to claim 23 for managing loans of memory within a data processing system, further comprising:
   means for only enabling a partition manager to reclaim said first selection of said plurality of memory units allocated to said at least one logical partition if a remote system manager sends a deallocation request to said partition manager.

31. The computer program product according to claim 23 for managing loans of memory within a data processing system, further comprising:
   means for tracking a billable cost for said loan of said second selection of memory units to said at least one logical partition based a unit cost associated with on at least one from among an amount of memory borrowed, a type of memory borrowed, and a time period for which memory is borrowed.

* * * * *